United States Patent [19]

Schroettle

[11] Patent Number: 5,221,819
[45] Date of Patent: Jun. 22, 1993

[54] CERAMIC SOLDERING ELEMENT

[75] Inventor: Wilhelm Schroettle, Munich, Fed. Rep. of Germany

[73] Assignee: Siemens Aktiengesellschaft, Munich, Fed. Rep. of Germany

[21] Appl. No.: 719,757

[22] Filed: Jun. 24, 1991

[30] Foreign Application Priority Data

Jul. 13, 1990 [EP] European Pat. Off. ........ 90113492.4

[51] Int. Cl.$^5$ ............................................. B23K 1/00
[52] U.S. Cl. ................................. 219/85.16; 219/237; 338/312
[58] Field of Search .............. 219/85.16, 233, 236, 219/237, 243, 85.18, 85.19, 543; 338/309, 311, 312, 314, 308; 228/51, 52, 53, 54

[56] References Cited

U.S. PATENT DOCUMENTS

| | | | |
|---|---|---|---|
| 2,886,854 | 5/1959 | Franklin | 338/311 |
| 3,230,338 | 1/1966 | Kawecki | 219/85.16 |
| 3,576,969 | 5/1971 | Sarty et al. | 219/237 |
| 3,775,725 | 11/1973 | Endo | 338/312 |
| 4,081,658 | 3/1978 | Ammann | 219/233 |
| 4,297,670 | 10/1981 | Solow | 338/308 |
| 4,315,128 | 2/1982 | Matcovich et al. | 219/233 |
| 4,412,123 | 10/1983 | Ammann et al. | 219/233 |
| 4,725,925 | 2/1988 | Tanaka et al. | 338/314 |

FOREIGN PATENT DOCUMENTS

| | | |
|---|---|---|
| 0357977 | 5/1990 | European Pat. Off. . |
| 0377873 | 7/1990 | European Pat. Off. . |
| 2847482 | 5/1980 | Fed. Rep. of Germany . |
| 61-209767 | 9/1986 | Japan ................. 219/237 |
| 63-153829 | 6/1988 | Japan ................. 228/51 |
| 2-147166 | 6/1990 | Japan ................. 219/237 |

OTHER PUBLICATIONS

Jensen, "Self-Leveling Soldering Tool", *IBM Technical Disclosure Bulletin*, vol. 11, No. 8, Jan. 1969, p. 1026.
*Elektronik*, vol. 25, Dec. 12, 1986, pp. 58–64.

Primary Examiner—Geoffrey S. Evans
Attorney, Agent, or Firm—Hill, Steadman & Simpson

[57] ABSTRACT

A ceramic soldering element, which is utilized in reflow soldering of electrical components that have a multitude of thermal legs, comprises a ceramic substrate, which is thermally conductive but electrically insulating, has a plurality of heating resistors disposed along an edge of the substrate, which edge forms a soldering edge and an arrangement consisting of metal layers on opposite surfaces of the substrate for applying electrical current to each of the heating resistors.

13 Claims, 1 Drawing Sheet

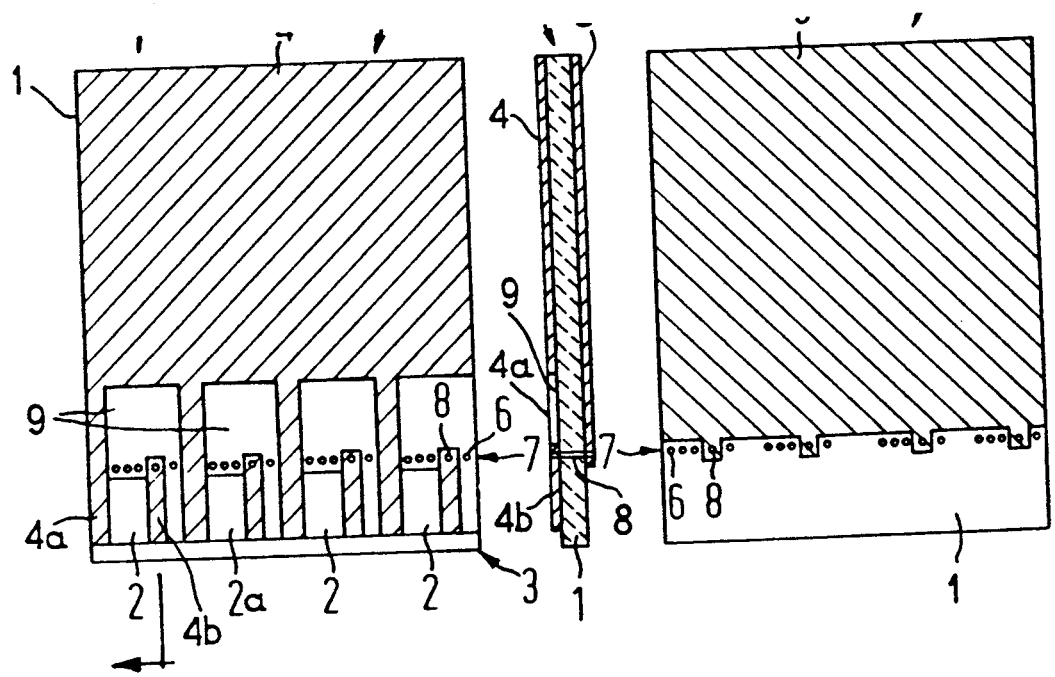

CERAMIC SOLDERING ELEMENT

BACKGROUND OF THE INVENTION

The present invention is directed to a ceramic soldering device for soldering with resistance heating, particular for the reflow soldering of electronic components that usually have a multitude of terminal legs.

As a rule, a defined force is exerted on the terminal legs of electronic components via a soldering device employed in the soldering equipment. The pressing of the soldering device and the heat transmission for the soldering process or, respectively, the production of the necessary heat usually occurs on the basis of the use of a soldering element. The standard embodiments are thereby executed so that the terminal legs of the electrical component are arranged side-by-side in a row and are pressed and heated by an edge or line-shaped soldering element, for example a U-shaped part having a long transverse web or bite portion. When the soldering element is of an electrically conductive material and the heat is generated by resistance heating in the soldering element, then there is a risk of damage to the electrical component due to the voltage drop-off or difference along the soldering element that will occur between the different terminal legs. The current generated in the component, as a result thereof, can have a disadvantageous consequence.

The notoriously utilized technique of reflow soldering with a soldering element has been improved for avoiding the above-described disadvantages. For example, work can be carried out with a low voltage in order to avoid a voltage difference between the individual electrical terminals of the component. The course of development embarked upon, however, has not favored this low-voltage technique, but has attempted to manage voltage drop-off or differences along the soldering element by utilizing different materials.

In detail, the reduction of the voltage differences or drop-off between various terminal legs of an electronic component during soldering can be reduced by the following measures, in addition to being reduced by the utilization of a low-voltage technique:

A. The material of the soldering element has a low ohmic resistance and the soldering element is divided into a plurality of soldering elements that are electrically connected in parallel. In this version, adequately large conductor cross sections can be utilized.

B. A second feature is that the soldering element can be manufactured of a sheet metal which is bent into a U-shape. The width of such a soldering element in the downward direction is limited by the thickness of the sheet metal and by the necessary bending radius. With this version, however, the voltage differences between different terminal legs can be eliminated by contacting a respective U-shaped soldering element to a terminal leg.

Developments that have taken the limited integration space of the soldering element into consideration have provided a coating with a ceramic for electrical installation of the soldering elements or devices at their contacting surfaces in the direction of the terminal legs. Simple coatings, however, harbor the risk that the ceramic layer will flake off, due to different coefficients of thermal expansion at the soldering element and at the ceramic layer.

European Published Patent Application 0 357 977, which claims priority from German Patent Application P 38 30 407, discloses a soldering element that comprises a ceramic strip or, respectively, a ceramic rod, which is glued into a channel of a soldering element. The contact between the terminal legs and the soldering element occurs via this ceramic strip. As a result of the low ohmic resistance of this soldering element, high electrical currents must flow through the soldering element in order to produce the necessary quantity of heat. This requires an involved switching and control technology which also requires an involved power supply. An extremely low-resistance connecting technique, further, is needed, given high currents. What is desirable here is the principle that the heat should arise in the soldering element and not at the electrical terminals of the soldering element. In order to exclude disadvantages in this respect to the greatest possible degree, planar ground and gold-plated contact surfaces are sometimes utilized at the expanded portions of the soldering element. An attempt has been made with temperature sensors in the form of thermal elements, which are additionally soldered on to monitor or control the temperature along the soldering element edge.

*IBM Technical Disclosure Bulletin*, Entitled "Self-Levelling Soldering Tool", Vol. 11, No. 8, January 1969, p. 1026, discloses a fully ceramic soldering element that has embedded resistant wires for generating heat. The mechanical holding occurs at the upper part of this ceramic element.

SUMMARY OF THE INVENTION

The object of the present invention is to provide a ceramic soldering element which has a soldering edge and can be employed for soldering electrical components without providing a voltage drop-off or difference between individual terminal legs of the component. The element also supplies heat needed for the soldering process to the soldering edge with good thermal conductivity and with low losses.

This object is achieved by providing a ceramic soldering device for soldering resistance heating, particularly for reflow soldering of electronic components. The device comprises a planar fashioned electrically non-conductive and highly thermally-conductive ceramic substrate having at least one soldering edge and at least one electrical resistor being planarly applied to the ceramic substrate in the immediate proximity of the soldering edge and means for forming electrical contacts for the resistor.

The invention is based on the perception that a fully ceramic and, thus, electrically non-conductive soldering element achieves far-reaching, critical advantages when it is composed of a ceramic material having a good thermal conductivity. This is particularly true of the soldering edge. For generating the quantity of heat needed for the process, at least one planarly fashioned electrical resistor is applied on the, likewise, planarly fashioned ceramic substrate in the immediate proximity of the soldering edge. The applications of the electrical resistor can be undertaken utilizing a thin-film or thick-film technology. The energy required for the soldering process is provided with the resistor via resistance heating and is forwarded via a highly thermally-conductive ceramic to the soldering edge that is placed onto the terminal legs of the electrical component being soldered.

An advantageous development of the invention provides for the fashioning of the ceramic substrate in the form of a rectangular wafer or sheet. The two large surface areas of the wafer or sheet that lie opposite one another serve the purpose of holding the ceramic substrate, for example with a clamping chuck, and for the application of the resistors, whereby one narrow side of the ceramic substrate represents the soldering edge that is pressed against the terminal legs. The resistors that serve the purpose of generating the process heat are positioned in the region of this soldering edge.

In order to be able to simultaneously exploit the clamping of the ceramic substrate, planar metal layers are applied onto the large surfaces of the rectangular wafer and engaged by the mechanical holding device, which applies electrical current thereto. This metal layer can be simultaneously applied with the resistors.

In order to guarantee a uniform thermal charging at the soldering edge of the ceramic substrate, it is advantageous to apply a plurality of resistors in a uniform distribution along the soldering edge.

When a predetermined temperature profile is required at the soldering edge, this can be produced by adjusting each of the resistors so that the individual resistors have different thermal outputs to provide the desired temperature profile. It is also possible to provide trimming resistors to enable an individual adjustment at each of the resistors.

An advantageous development of the invention provides a thermal resistance within the ceramic soldering element in the form of a row of bores that are represented by bores placed side-by-side along a line extending parallel to the soldering edge at that side of the resistor lying opposite the soldering edge. This row of bores, which form means to resist thermal flow, reduces the effective heat-conducting cross section of the soldering element in the direction away from the edge. As needed, a plurality of rows of bores can be placed in succession.

The bores that were introduced for reducing the thermal conductivity cross section can be simultaneously utilized to provide feed-throughs in an advantageous way.

An advantageous selection of the material for the ceramic substrate, preferably for the region of the soldering edge, is formed by utilizing a ceramic having a high thermal conductivity. The employment of beryllium oxide or of aluminum nitride is particularly desirable as a material.

Other advantages and features of the invention will be readily apparent from the following description of the preferred embodiments, the drawings and claims.

BRIEF DESCRIPTION OF THE DRAWINGS

FIG. 1 is a front view of a ceramic soldering device in accordance with the present invention;

FIG. 2 is a cross sectional view taken along the lines II—II of the device; and

FIG. 3 is a rear view of the device of FIG. 1.

DESCRIPTION OF THE PREFERRED EMBODIMENTS

The principles of the present invention are particularly useful in a soldering device, generally indicated at 10 in the Figures. As illustrated best in FIG. 2, the device 10 includes a ceramic substrate 1. As a result of employing a fully ceramic soldering element, no voltage differences will occur between the individual terminal legs when soldering electrical components. This is achieved by utilizing a ceramic that is not electrically conductive. At the same time, the ceramic substrate is composed of a ceramic having good thermal conductivity, such as, for example, aluminum nitride. Since no voltage differences occur at the soldering edge of the fully ceramic soldering element, these soldering elements can be designed for higher operating voltages. A design with respect to the operating voltage and with respect to the heating capacity to be produced by a resistor can be implemented with the knowledge available to a person skilled in the art. The thin-film or thick-film technology that is employed for applying a resistor onto a ceramic substrate is characterized either by the vapor deposition or sputtering or by a silkscreening method. Structures applied in thick-film technology usually contain glass constituents. The manufacture of ceramic soldering elements, thus, occurs with methods standard in electrical engineering for coating and structuring ceramic substrates.

Since the design of the electrical supply of the ceramic soldering element is, thus, not tied to narrow limits with respect to the operating voltage, relatively low currents can also be used for the heating process. Simpler power supplies can, thus, be fundamentally utilized for the operation of such a soldering device.

As illustrated in FIG. 2, the ceramic substrate 1 has a thickness that remains substantially constant over the entire height, whereas the lower edge represents a soldering edge 3. In FIG. 1, four resistors 2 have been applied by a thin-film technology on a front surface of the ceramic substrate 1. Electrical contacting occurs with a metal foil 4, which, for each resistor, has a leg 4a contacting one side of the resistor 2 and a leg 4b contacting the opposite side. As illustrated, a portion 9 of the surface of the substrate 1 adjacent each of the resistors 2 is free of any metal foil. A back surface of the substrate 2, as illustrated in FIG. 3, is provided with a metal layer 5 and this metal layer 5 is in electrical contact with each of the portions 4b by a separate electrical feed-through 8. For example, clamping jaws that simultaneously represent the electrical leads for the soldering element can be utilized for manipulating the ceramic soldering element. The clamping jaws would thereby grasp the soldering element in the upper region and would guarantee the electrical supply by contact with the two metal foils 4 and 5. A row 7 of bores, which are composed of a plurality of bores 6, will produce an increased thermal resistance so that a privileged direction of thermal flow toward the soldering edge will prevail. It should be noted that one of these bores 6 is utilized for the electrical through-contact 8 for each of the portions 4b.

For monitoring the temperature, a high-temperature conductor can be simultaneously applied in the coating process for the resistors 2.

The soldering edge 3 should remain uncoated. Although there is the possibility of covering the entire structure by a glazing layer, in turn, and, thus, electrically insulating it, an application of the resistors on the soldering edge 3 is not meaningful. The resistor 2 must be planarly applied and must, therefore, be applied on a broad side of the ceramic substrate 1. The resistors 2 that serve the purpose of heating are arranged at a slight spacing along the soldering edge and are electrically connected in parallel. By integrating trimming resistors in or between the heating resistors, different temperature profiles along the soldering edge can be set up as needed. It is also possible, if the use of the device is known, to establish the profile by shaping adjacent resistors with different heating capacities so that a resistor, such as 2a is different than its adjacent resistors 2. A heat consumption that may be different on a case-by-case basis for soldering at different terminal legs can, thus, be taken into consideration by a selected profile. For example, this can be caused by terminal spots of different sizes.

The ceramic substrate 1 represents the actual carrying component in the inventive embodiment of the soldering element. At the same time, a narrow side is used as the soldering edge, given the planar fashion of the ceramic substrate 1. By contrast to the prior art, the electrical conductors are not contact parts. The employment of the above-mentioned ceramic material, such as an aluminum nitride, guarantees a thermal conductivity that corresponds to that of metal, which is usually employed. Ceramic fillers, for example having a thermal conduction coefficient k of at least 10 W/mK and, dependent upon modification, aluminum nitride has a thermal conduction coefficient k of 30–150 W/mK.

Although various minor modifications may be suggested by those versed in the art, it should be understood that I wish to embody within the scope of the patent granted hereon all such modifications as reasonably and properly come within the scope of my contribution to the art.

I claim:

1. A ceramic soldering element for soldering with resistance heating for reflow soldering of electronic components, said soldering element comprising a planarly fashioned, electrically non-conductive and highly thermally conductive ceramic substrate having at least one soldering edge, a plurality of planar electrical resistors being applied on a surface of the ceramic substrate adjacent the soldering edge at approximately identical spacing and in uniform distribution, and means for forming electrical contacts for the electrical resistors.

2. A ceramic soldering element according to claim 1, wherein the means for forming electrical contacts for each of the resistors includes metal layers applied on opposite planar surfaces of the ceramic substrate with a layer on the surface of the substrate opposite the surface supporting the resistor having means for forming an electrical contact therewith.

3. A ceramic soldering element according to claim 2, wherein the ceramic substrate includes restriction means to restrict thermal flow away from the soldering edge, said restriction means extending along a line spaced from the soldering edge at a distance greater than the distance of the resistors.

4. A ceramic soldering element according to claim 3, wherein said restriction means to restrict thermal flow comprises at least one row of bores extending through the ceramic substrate.

5. A ceramic soldering element according to claim 4, wherein some of the bores form electrical feed-throughs for connecting portions of a metal layer on one surface to the metal layer on the opposite surface.

6. A ceramic soldering element according to claim 1, which includes trimming resistors being integrated between the plurality of the resistors to produce different heating capacities.

7. A ceramic soldering element for soldering with resistance heating for the reflow soldering of electronic components, said soldering element comprising a planarly fashioned, electrically non-conductive and highly thermally conductive ceramic substrate having at least one soldering edge, a planar electrical resistor being applied on the ceramic substrate in immediate proximity to the soldering edge, means for forming electrical contacts for the electrical resistor and restriction means to resist flow away from the soldering edge, said restriction means extending along a line spaced from the soldering edge at a distance greater than the distance of the resistor from said edge.

8. A ceramic soldering element according to claim 7, wherein said restriction means comprises at least one row of bores extending through the ceramic substrate.

9. A ceramic soldering element according to claim 8, wherein one of the bores forms an electrical feed-through for connecting a portion of a metal layer on one surface of the substrate to a metal layer on the opposite surface of the substrate.

10. A ceramic soldering element for soldering with resistance heating for reflow soldering of electronic components, said soldering element comprising a planarly fashioned, electrically non-conductive and highly thermally conductive ceramic substrate having a form of a rectangular wafer having one narrow side forming a soldering edge, a planar electrical resistor in the form of a thin film being applied on one surface of the ceramic substrate in immediate proximity to the soldering edge, said ceramic substrate including restriction means for restricting thermal flow away from the soldering edge, said restriction means extending along a line spaced from the soldering edge at a distance greater than the distance of the resistor from said soldering edge, and means for forming electrical contacts for the electrical resistor including a planar metal layer being applied on the one planar surface of the substrate and being in contact with the resistor.

11. A ceramic soldering element according to claim 10, wherein the means for forming electrical contacts includes a second metal layer on a surface of the ceramic substrate opposite to said one surface and having means for forming a contact with the resistor.

12. A ceramic soldering element according to claim 10, which includes a plurality of resistors adjacent the soldering edge and includes trimming resistors being integrated between the plurality of the resistors to produce different heating capacities.

13. A ceramic soldering element according to claim 10, wherein said restriction means comprises at least one row of bores extending through the ceramic substrate.

* * * * *